(12) United States Patent
Manfredi et al.

(10) Patent No.: US 7,934,682 B2
(45) Date of Patent: May 3, 2011

(54) AIRCRAFT SAFETY SYSTEM

(76) Inventors: Dario P. Manfredi, Berkley Heights, NJ (US); Savia N. Giarraffa, Ironia, NJ (US)

(*) Notice: Subject to any disclaimer, the term of this patent is extended or adjusted under 35 U.S.C. 154(b) by 467 days.

(21) Appl. No.: 11/825,758

(22) Filed: Jul. 9, 2007

(65) Prior Publication Data

US 2008/0142635 A1    Jun. 19, 2008

(51) Int. Cl.
*B64D 17/00* (2006.01)
(52) U.S. Cl. .................................................. 244/139
(58) Field of Classification Search ............. 244/139
See application file for complete search history.

(56) References Cited

U.S. PATENT DOCUMENTS

| | | | | |
|---|---|---|---|---|
| 2,665,093 A * | 1/1954 | Raiti et al. | ........ | 244/139 |
| 2,973,164 A * | 2/1961 | Grill | ........ | 244/3.25 |
| 3,726,216 A * | 4/1973 | Calder et al. | ........ | 102/275.8 |
| 3,895,552 A * | 7/1975 | Lagofun | ........ | 83/580 |
| 4,050,657 A * | 9/1977 | Murphy | ........ | 244/139 |
| 4,102,428 A * | 7/1978 | Kelly et al. | ........ | 181/116 |
| 4,143,841 A * | 3/1979 | Roeder | ........ | 244/140 |
| 4,298,177 A * | 11/1981 | Berlongieri | ........ | 244/139 |
| 4,306,693 A * | 12/1981 | Cooper | ........ | 244/135 R |
| 4,727,808 A * | 3/1988 | Wang et al. | ........ | 102/202.5 |
| 5,009,374 A * | 4/1991 | Manfredi et al. | ........ | 244/1 R |
| 5,765,778 A * | 6/1998 | Otsuka | ........ | 244/101 |
| 5,826,827 A * | 10/1998 | Coyaso et al. | ........ | 244/139 |
| 6,641,087 B1 * | 11/2003 | Nelson | ........ | 244/118.5 |
| 2003/0127565 A1 * | 7/2003 | Haffen et al. | ........ | 244/139 |

* cited by examiner

*Primary Examiner* — Tien Dinh
*Assistant Examiner* — Justin Benedik
(74) *Attorney, Agent, or Firm* — Dilworth & Barrese, LLP

(57) ABSTRACT

A system for enabling the safe landing of an aircraft during an in-flight emergency is provided. The system includes a plurality of onboard devices for releasably securing a plurality of wings to a fuselage, and a non-electric module for activating said onboard devices. Said onboard devices are released to separate said wings from the fuselage.

21 Claims, 5 Drawing Sheets

AIRCRAFT SAFETY SYSTEM

BACKGROUND OF THE INVENTION

The present invention relates, in general, to the field of aviation. More specifically, it relates to a system that enables the safe landing of an aircraft in case of an in-flight emergency.

In the eventuality of an in-flight emergency, an aircraft may be required to perform emergency landing procedures. In order to facilitate safe emergency landing procedures, the aircraft is equipped with various aircraft safety systems. These aircraft safety systems may deploy safety devices, such as parachutes, drog chutes, rocket members, and airbags. For example, the parachutes help to reduce the downward speed of the fall of the aircraft during the in-flight emergency. The 'Drog chutes' help in reducing the forward speed of the aircraft. The 'rocket members' may be used for reducing the downward speed of the fall of the aircraft, the forward speed of the aircraft, or both, depending on their alignment with the aircraft. The 'airbags' help in reducing the impact of the aircraft on landing. Apart from the safety devices mentioned above, the aircraft safety systems may deploy various wing-release mechanisms to release wings from a fuselage. Usually, the wing-release mechanisms are not easy to install and may not be easy to use. Furthermore, such wing-release mechanisms are electric-based mechanisms, which require a regular power supply for its activation. This, in turn, renders the wing release mechanisms unusable in case of power failure. Moreover, a fault in the deployment of parachutes, after the wings have already been separated from the fuselage, may prove to be fatal.

In light of the foregoing discussion, there is a need for an aircraft safety system that is non-electric based, and may be activated even in the case of power failure. The installation of the aircraft safety system should be apparent to a person skilled in the art. Moreover, the aircraft safety system should be easy to use by a pilot or a passenger in case of emergency.

SUMMARY OF THE INVENTION

An object of the present invention is to provide an aircraft safety system that is non-electric based, and may be activated even in case of power failure.

Another object of the present invention is to make the aircraft safety system relatively straightforward to be installed by a pilot, a passenger or a person skilled in the art in case of emergency.

Another object of the present invention is to enable separation of wings from a fuselage in a rapid manner.

Another object of the present invention is to provide features that make the aircraft safety system reliable.

Embodiments of the present invention provide an aircraft safety system for enabling a safe landing of an aircraft during an in-flight emergency. The aircraft includes a fuselage and a plurality of wings. The fuselage includes a frame and a tail. Each wing includes one or more beams secured to and extending from the said frame. The aircraft safety system includes a plurality of onboard devices that releasably secure said beams of said wings to the said frame. Further, the aircraft safety system includes a non-electric module for activating said onboard devices. Said onboard devices release said wings upon activation, therefore, said non-electric module enables said onboard devices to be activated even in case of power failure, thereby making the aircraft safety system reliable.

Said non-electric module includes a control arrangement, a plurality of energetic devices, a first set of transfer lines, and a second set of transfer lines. The control arrangement produces an initiation signal. The first set of transfer lines connects the control arrangement with said energetic devices, and transfers the initiation signal from the control arrangement to said energetic devices. The second set of transfer lines connects said energetic devices with said onboard devices, and transfers the initiation signal from said energetic devices to said onboard devices. Said onboard devices are activated based on the initiation signal. Each of said onboard devices explodes when activated, thereby separating said wings from the fuselage in a rapid manner.

The aircraft safety system includes one or more fuselage parachutes, and a fuselage-parachute manager for deploying said fuselage parachutes. Said fuselage parachutes are deployed prior to the separation of said wings from the fuselage. This ensures that if said fuselage parachutes are not deployed, said wings do not separate from the fuselage. The aircraft safety system also includes a plurality of wing parachutes, and a wing-parachute manager for deploying said wing parachutes.

Further, the aircraft safety system includes one or more drog chutes, and a drog-chute manager for deploying said drog chutes. Said fuselage parachutes and said wing parachutes are deployed to reduce the downward speed of the fall of the aircraft. Said drog chutes are deployed to reduce the forward speed of the aircraft to a predefined speed. The predefined speed enables safe separation of said wings from the fuselage.

Further, the aircraft safety system includes one or more fuselage airbags, and an airbag manager for deploying said fuselage airbags. Said fuselage airbags are deployed prior to an impact of the fuselage with a surface, such as a piece of land or a body of water. Moreover, the aircraft safety system includes a remote control, which is used for remotely controlling said non-electric module.

BRIEF DESCRIPTION OF DRAWINGS

Embodiments of the present invention will hereinafter be described in conjunction with the appended drawings provided to illustrate and not to limit the present invention, wherein like designations denote like elements, and in which.

DETAILED DESCRIPTION OF THE PREFERRED EMBODIMENTS

Embodiments of the present invention provide a system for enabling a safe landing of an aircraft during an in-flight emergency. In the description of the present invention, numerous specific details are provided, such as examples of components and/or mechanisms, to provide a thorough understanding of the various embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
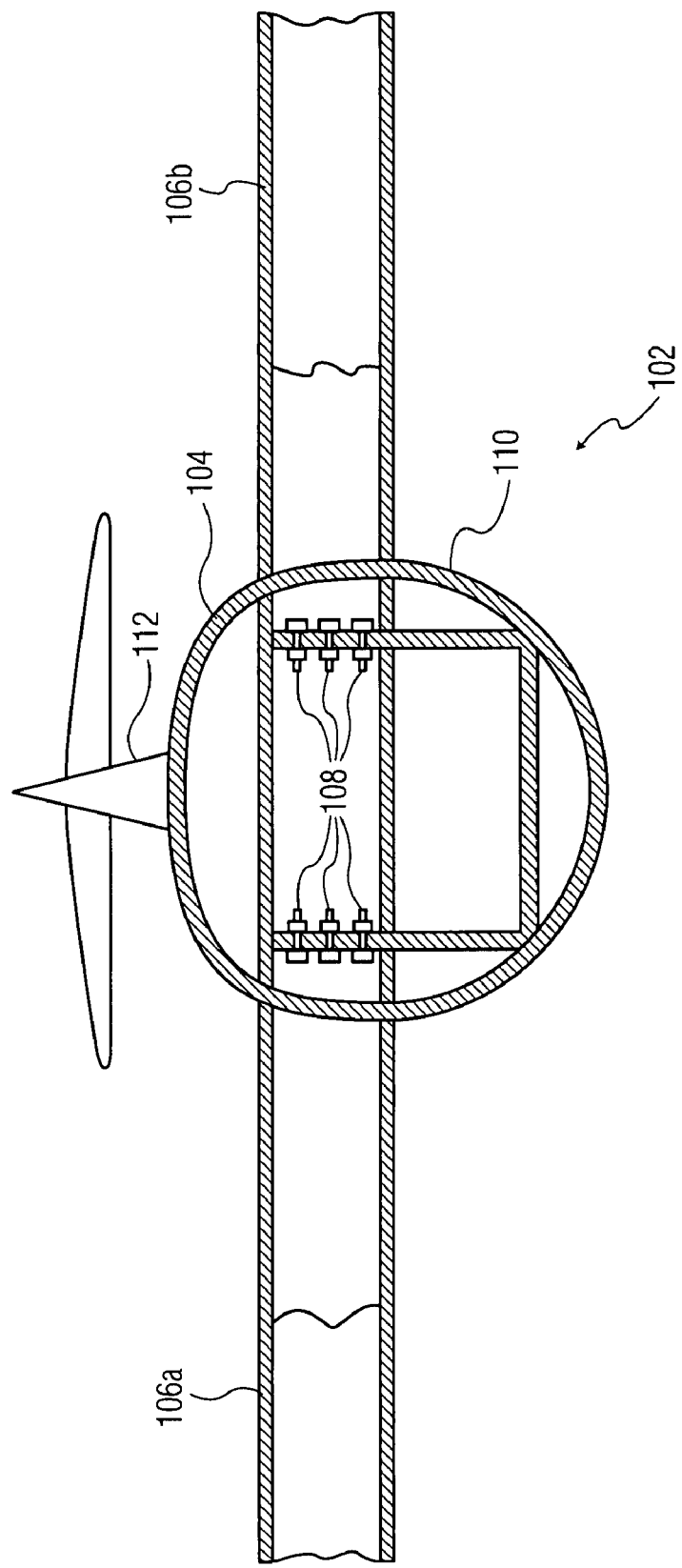
FIG. 1 illustrates a partial cross-sectional view of an aircraft, wherein embodiments of the present invention may be practiced.

FIG. 1 illustrates a partial cross-sectional view of an aircraft 102, wherein embodiments of the present invention may be practiced. Aircraft 102 includes a fuselage 104 and a plurality of wings, such as a wing 106a and a wing 106b. Wing 106a and wing 106b are hereinafter referred to as wings 106. Fuselage 104 includes a frame 110 and a tail 112. Each of wings 106 includes one or more beams secured to and extending from frame 110. Said beams are releasably secured to frame 110 by a plurality of onboard devices, such as onboard devices 108. According to various embodiments of the present invention, onboard devices 108 provide releasable connection between surfaces. Examples of onboard devices 108 may include, but are not limited to, explodable bolts, explodable rivets, burnable tapes, and pins. For example, as described in U.S. Pat. No. 5,009,374, explodable bolts may be disposed within connections between said beams and frame 110. Explodable rivets and burnable tapes may be disposed within connections between an outer skin of fuselage 104 and an outer skin of each of wings 106. Alternatively, wings 106 may be releasably secured to fuselage 104 by using the pins. According to various embodiments of the present invention, wings 106 may be connected to fuselage 104 in any such manner.

In accordance with an embodiment of the present invention, each of wings 106 may be provided with one or more hydraulic lines and fuel lines extending from fuselage 104. Further, each of wings 106 may include connecting cables extending from fuselage 104. Examples of such connecting cables may include, but are not limited to, aileron cables/rods, flap-control cables/rods, and electrical-connector bundles.

It is to be understood that the specific description for aircraft 102 is for the convenience of the reader and is not to be construed as limiting aircraft 102 to specific numbers, sizes, shapes or types of fuselage 104, wings 106, and onboard devices 108 included in aircraft 102. Aircraft 102 may be a single passenger aircraft, which may be propeller-driven or jet engine driven. Aircraft 102 may be of jumbo-jet size, and may be driven by multiple engines.

Figure 2:
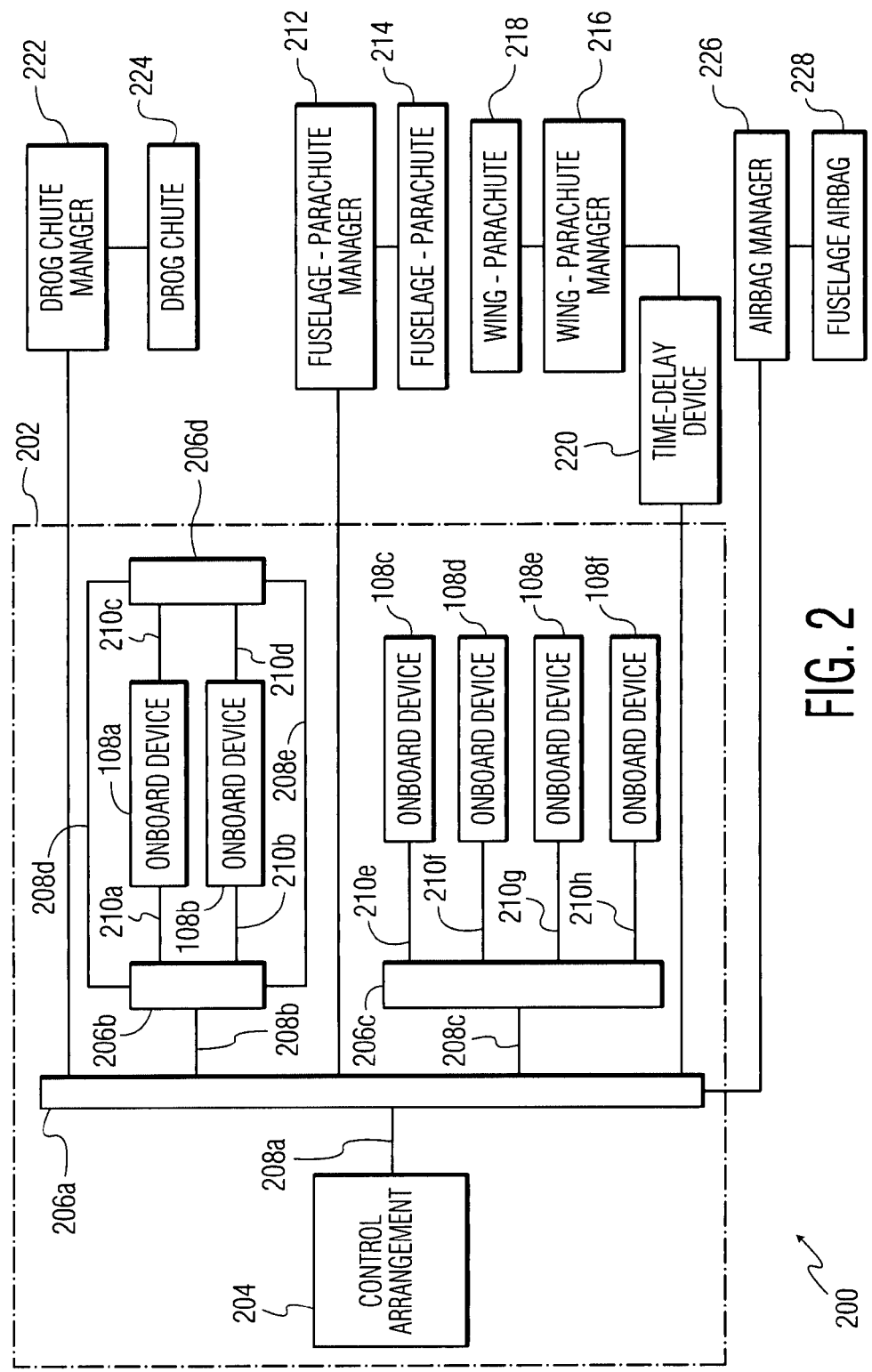
FIG. 2 illustrates an exemplary schematic view of an aircraft safety system with reference to one of the wings in accordance with an embodiment of the present invention.

FIG. 2 illustrates an exemplary schematic view of an aircraft safety system 200 with reference to one of said wings 106, in accordance with an embodiment of the present invention. Aircraft safety system 200 includes onboard devices 108, such as an onboard device 108a, an onboard device 108b, an onboard device 108c, an onboard device 108d, an onboard device 108e and an onboard device 108f, and a non-electric module 202 for activating said onboard devices 108. Further, non-electric module 202 includes a control arrangement 204, a plurality of energetic devices, such as an energetic device 206a, an energetic device 206b, an energetic device 206c and an energetic device 206d, a first set of transfer lines, such as a transfer line 208a, a transfer line 208b, a transfer line 208c, a transfer line 208d and a transfer line 208e, and a second set of transfer lines, such as a transfer line 210a, a transfer line 210b, a transfer line 210c, a transfer line 210d, a transfer line 210e, a transfer line 210f, a transfer line 210g and a transfer line 210h.

Energetic device 206a, 206b, 206c and 206d are hereinafter referred to as energetic devices 206. Transfer line 208a, 208b, 208c, 208d and 208e are hereinafter referred to as first transfer lines 208. Transfer line 210a, 210b, 210c, 210d, 210e, 210f, 210g and 210h are hereinafter referred to as second transfer lines 210.

Energetic device 206a, energetic device 206b, energetic device 206c and energetic device 206d are non-electric boards with multiple ports for connecting transfer lines. For example, energetic device 206b has five ports for connecting transfer lines 208b, 208d, 208e, 210a and 210b. Similarly, energetic device 206a, energetic device 206c and energetic device 206d has seven, five and four ports respectively for connecting transfer lines.

Aircraft safety system 200 also includes a fuselage-parachute manager 212, a fuselage parachute 214, a wing-parachute manager 216, a wing parachute 218, a time-delay device 220, a drog-chute manager 222, a drog chute 224, an airbag manager 226, and a fuselage airbag 228.

Onboard devices 108 releasably secure said beams of each of wings 106 to frame 110, thereby forming releasable connections between said beams and frame 110. Control arrangement 204 produces an initiation signal. First transfer lines 208 connect control arrangement 204 with energetic devices 206, and transfer the initiation signal from control arrangement 204 to energetic devices 206. According to various embodiments of the invention, energetic devices 206 are non-electric boards that transfer the initiation signal received from control arrangement 204 to onboard devices 108. In accordance with an embodiment of the present invention, at least one of said energetic devices 206 is mounted on each of wings 106.

Further, second transfer lines 210 connect energetic devices 206 with onboard devices 108, and transfer the initiation signal from energetic devices 206 to onboard devices 108. Onboard devices 108 are activated based on the initiation signal. Onboard devices 108 are released to separate at least one of wings 106, upon activation. Each of onboard devices 108 explodes when activated, thereby releasing a respective one of the said beams. In an embodiment of the present invention, the explodable bolts may be disposed within the connections between said beams and frame 110. The explodable rivets and burnable tapes may be disposed within the connections between the outer skin of fuselage 104 and the outer skin of each of wings 106. The explodable bolts and rivets explode, while the burnable tapes burn, upon activation. This results into destruction of said connections between wings 106 and fuselage 104, and leads to the separation of wings 106 from fuselage 104.

In an embodiment of the present invention, wings 106 may be releasably secured to fuselage 104 by using pins. In such a case, pin pullers may be used to release the pins. As mentioned above, each of wings 106 may be provided with one or more hydraulic lines and fuel lines extending from fuselage 104. In an embodiment of the present invention, a quick-disconnect mechanism may be employed to enable disconnection of said hydraulic lines and said fuel lines. For example, BALVAC® self-sealing breakaway fuel valves, manufactured by Spectrum®, may be used for disconnecting said hydraulic lines and said fuel lines. Further, each of said wings 106 may include connecting cables, extending from fuselage 104, which may be disconnected by using cutting devices, such as cable cutters.

Further, control arrangement 204 employs a reliable initiation mechanism to produce an initiation signal. For example, control arrangement 204 may use an arm fire device, such as a safety squib, to ignite first transfer lines 208. In accordance with an embodiment of the present invention, first transfer lines 208 and second transfer lines 210 are fiber-optic transfer lines, such as laser-initiated Cartridge Actuated Device/ Propellant Actuated Device (CAD/PAD) devices. Fiber-optic transfer lines are flexible, and are coated with carbon black. This makes these transfer lines sensitive to various light bands, which, in turn, enables rapid ignition of these transfer lines. Other examples of first transfer lines 208 and second transfer lines 210 may include, but are not limited to, explosive transfer lines and detonation cords.

With reference to FIG. 2, control arrangement 204 produces the initiation signal, and transfers it to energetic device 206a through transfer line 208a. Energetic device 206a transfers the initiation signal to energetic device 206b and energetic device 206c through transfer line 208b and transfer line 208c, respectively. Subsequently, energetic device 206b transfers the initiation signal to onboard device 108a and onboard device 108b, from one end, through transfer line 210a and transfer line 210b, respectively. In addition, energetic device 206b transfers the initiation signal to energetic device 206d. Thereafter, energetic device 206d transfers the initiation signal to onboard device 108a and onboard device 108b, from the other end, through transfer line 210c and transfer line 210d, respectively. Onboard device 108a and onboard device 108b explode upon activation by the initiation signal, thereby releasing said beams from frame 110. Onboard device 108a and onboard device 108b are explodable bolts, and may be activated from one or both ends. Energetic device 206c transfers the initiation signal to onboard device 108c, onboard device 108d, onboard device 108e and onboard device 108f. Onboard device 108c, onboard device 108d, onboard device 108e and onboard device 108f are released in order to disconnect various cables and lines within said wing. In various embodiments of the present invention, onboard device 108c, onboard device 108d, onboard device 108e and onboard device 108f are cable cutters for cutting various cables, such as hydraulic lines, fuel lines, aileron cables/rods, flap-control cables/rods, and electrical-connector bundles.

Energetic device 206a is connected with fuselage-parachute manager 212. In accordance with an embodiment of the present invention, fuselage-parachute manager 212 deploys fuselage parachute 214 prior to the separation of wings 106 from fuselage 104. This ensures that if fuselage parachute 214 is not deployed, wings 106 do not separate from fuselage 104.

In addition, energetic device 206a is connected with wing-parachute manager 216 through time-delay device 220. Wing-parachute manager 216 deploys wing parachute 218. Time-delay device 220 introduces a time delay between the deployment of fuselage parachute 214 and the deployment of wing parachute 218. Time-delay device 220 is a pyrotechnic device used to sequence the events, thereby introducing a time delay.

As mentioned above, it is desired to deploy fuselage parachute 214 prior to the separation of wings 106 from fuselage 104. For this purpose, the time-delay devices may be placed between energetic device 206a and energetic device 206b, and between energetic device 206a and energetic device 206c. Examples of the time-delay devices may include, but are not limited to, pyrotechnic time delay devices, manufactured by Scot Incorporated.

Fuselage-parachute manager 212 includes one or more fuselage-parachute mortars within fuselage 104. Said fuselage-parachute mortars are used to store and deploy one or more fuselage parachutes 214. Fuselage parachutes 214 are stored in the barrels of said fuselage-parachute mortars. Fuselage parachutes are explained in detail in conjunction with FIG. 4.

Similarly, wing-parachute manager 216 includes a plurality of wing-parachute mortars within wings 106. Said wing-parachute mortars are used to store and deploy a plurality of wing parachutes 218. At least one of said wing parachutes 218 is stored on each of wings 106. In an embodiment of the present invention, each of wings 106 may have separate wing-parachute managers. A wing parachute is stored in a barrel of a wing-parachute mortar. Such parachute mortars may be operated electrically or non-electrically like any pyrotechnic device. For example, percussion primers may be used to non-electrically operate these parachute mortars.

Fuselage parachute 214 and wing parachute 218 helps to reduce the downward speed of the fall of fuselage 104 and wings 106, respectively. This ensures a safe landing of fuselage 104 and wings 106.

In addition, energetic device 206a is connected with a drog-chute manager 222. In accordance with an embodiment of the present invention, drog-chute manager 222 deploys drog chute 224 prior to the separation of wings 106 from fuselage 104. Drog chute has been explained in detail in conjunction with FIG. 3.

Further, energetic device 206a is connected with airbag manager 226. In accordance with an embodiment of the present invention, airbag manager 226 deploys fuselage airbag 228 prior to an impact of fuselage 104 with a surface, such as a piece of land or a body of water. This helps to lower the impact on fuselage 104, and provide floatation in case fuselage 104 lands on a body of water.

In accordance with an embodiment of the present invention, aircraft safety system 200 may include a remote control. The remote control may be used to remotely control non-electric module 202. This enables activation of aircraft safety system 200 from a remote location, for example, by a person designated at homeland security.

In accordance with an embodiment of the present invention, aircraft safety system 200 may include an emergency power supply, such as a thermal battery. The emergency power supply provides power supply to electrically operated devices even in case of power failure.

It is to be understood that the specific designation for aircraft safety system 200 is for the convenience of the reader and is not to be construed as limiting aircraft safety system 200 to specific numbers or types of onboard devices 108, non-electric module 202, control arrangement 204, energetic devices 206, first transfer lines 208, second transfer lines 210, fuselage-parachute manager 212, fuselage parachute 214, wing-parachute manager 216, wing parachute 218, time-delay device 220, drog-chute manager 222, drog chute 224, airbag manager 226, fuselage airbag 228. Various components of aircraft safety system 200 may be employed partly or completely within either fuselage 104 or wings 106. Further, different components of aircraft safety system 200 may have separate control arrangements. For example, non-electric module 202 may be initiated by one control arrangement, while fuselage-parachute manager 212 and wing-parachute manager 216 may be initiated by another control arrangement, and so on.

Figure 3:
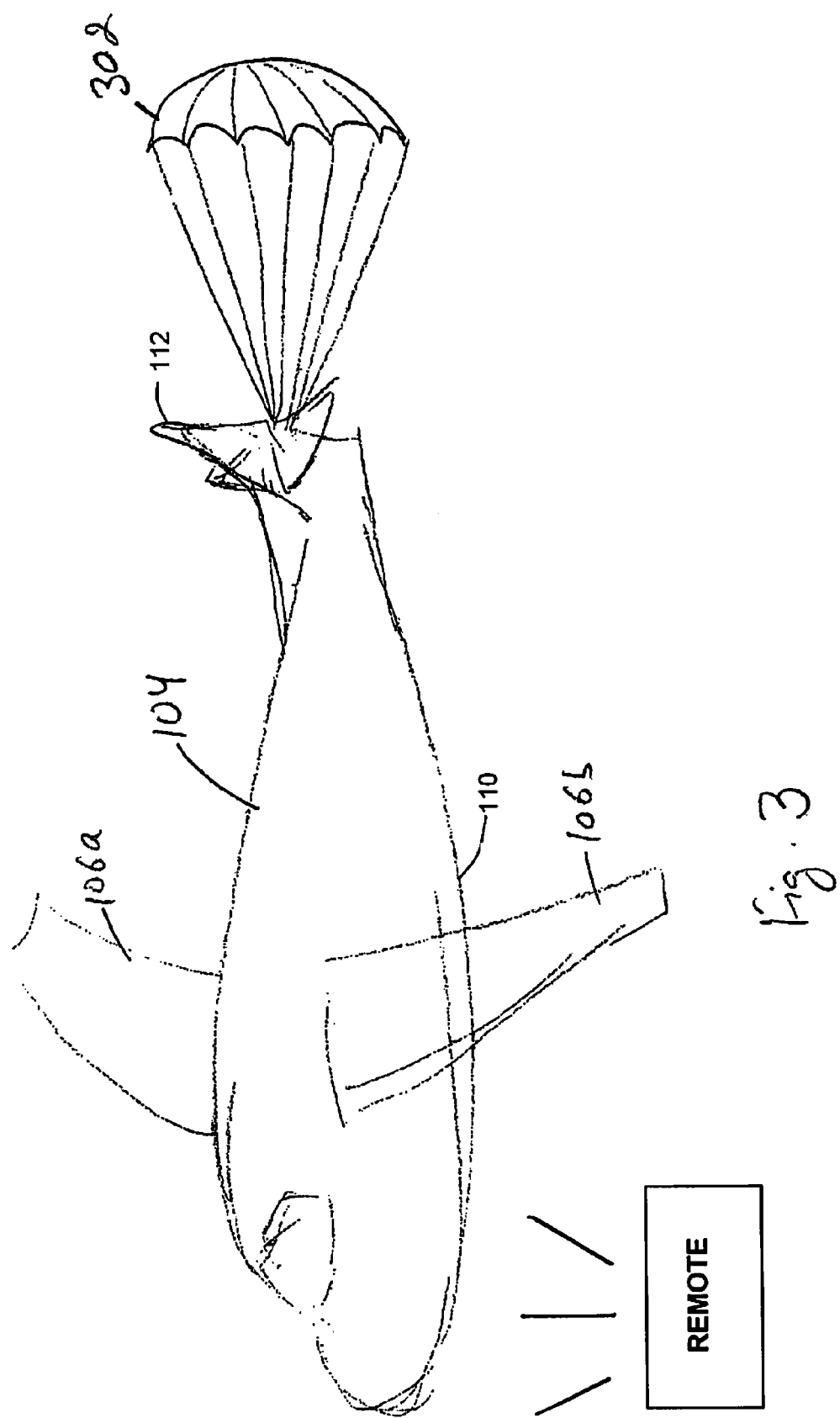
FIG. 3 illustrates deployment of a drog chute in an aircraft, in accordance with an embodiment of the present invention.

FIG. 3 illustrates deployment of a drog chute 302 in aircraft 102, in accordance with an embodiment of the present invention. With reference to FIG. 3, drog chute 302 is deployed prior to the separation of wings 106 from fuselage 104. Drog chute 302 helps reduce the forward speed of aircraft 102 to a predefined speed. The predefined speed enables safe separation of wings 106 from fuselage 104. In various embodiments of the present invention, the predefined speed may be user-defined or system-defined. Wings 106 may be safely separated from fuselage 104 at the predefined speed.

Fuselage 104 includes tail 112 with one or more compartments for storing one or more drog chutes, such as drog chute 302. Said drog chutes are stored in a collapsed state. In an embodiment of the present invention, drog chute 302 is held within a compartment with the help of pins. In such a case, pin pullers may be used to release the pins, while the compartment is opened to release and deploy drog chute 302.

Figure 4:
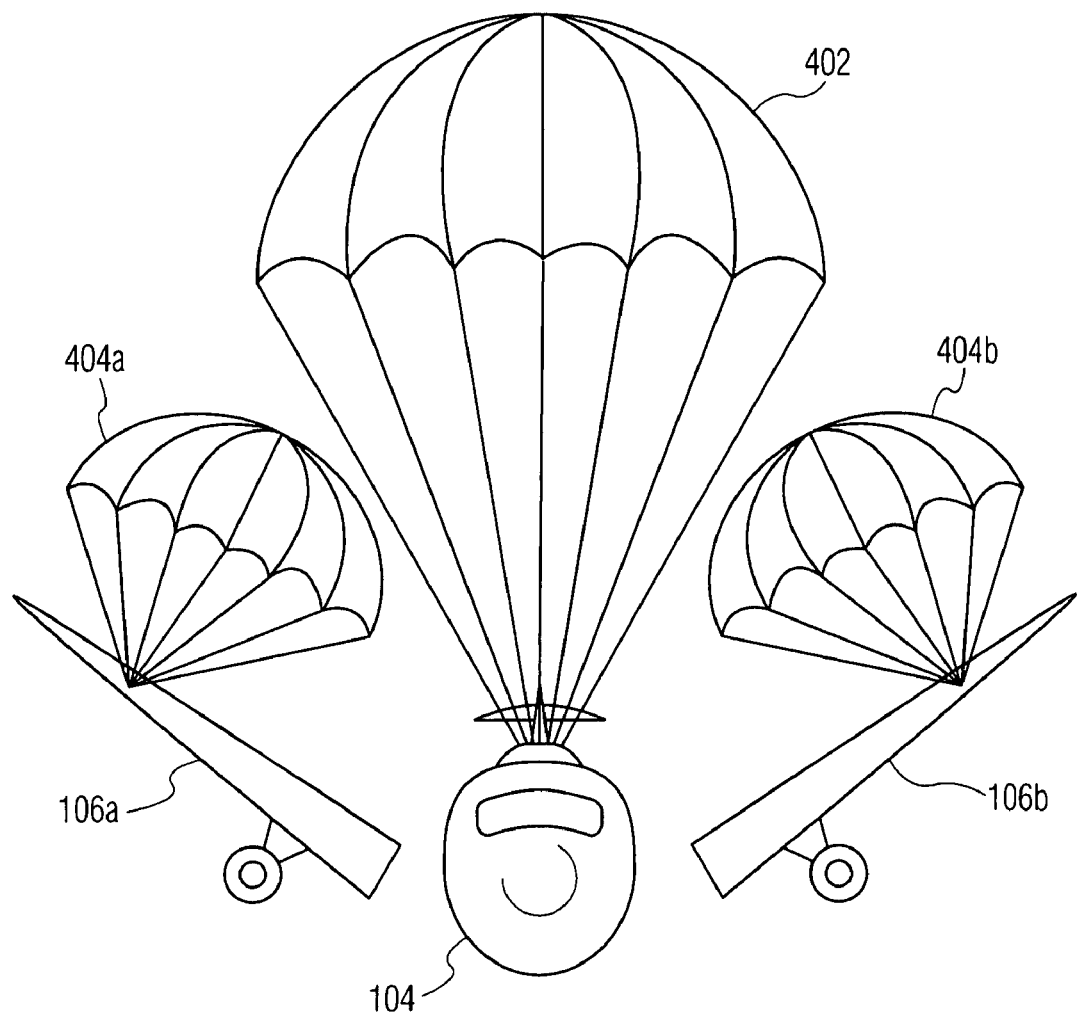
FIG. 4 illustrates deployment of one or more parachutes in an aircraft, in accordance with an embodiment of the present invention.

FIG. 4 illustrates deployment of one or more parachutes in aircraft 102, in accordance with an embodiment of the present invention. With reference to FIG. 4, a fuselage parachute 402, a wing parachute 404a, a wing parachute 404b, and non-electric module 202 have been deployed.

Fuselage parachutes 214 are stored in a collapsed state in the barrels of fuselage 104. In accordance with an embodiment of the present invention, a canopy above the barrel is jettisoned, while said fuselage parachute 402 is launched away from fuselage 104.

After separation from wings 106, fuselage 104 floats down with the help of fuselage parachute 402. Wing 106a and wing 106b also float down with the help of wing parachute 404a and wing parachute 404b, respectively.

Figure 5:
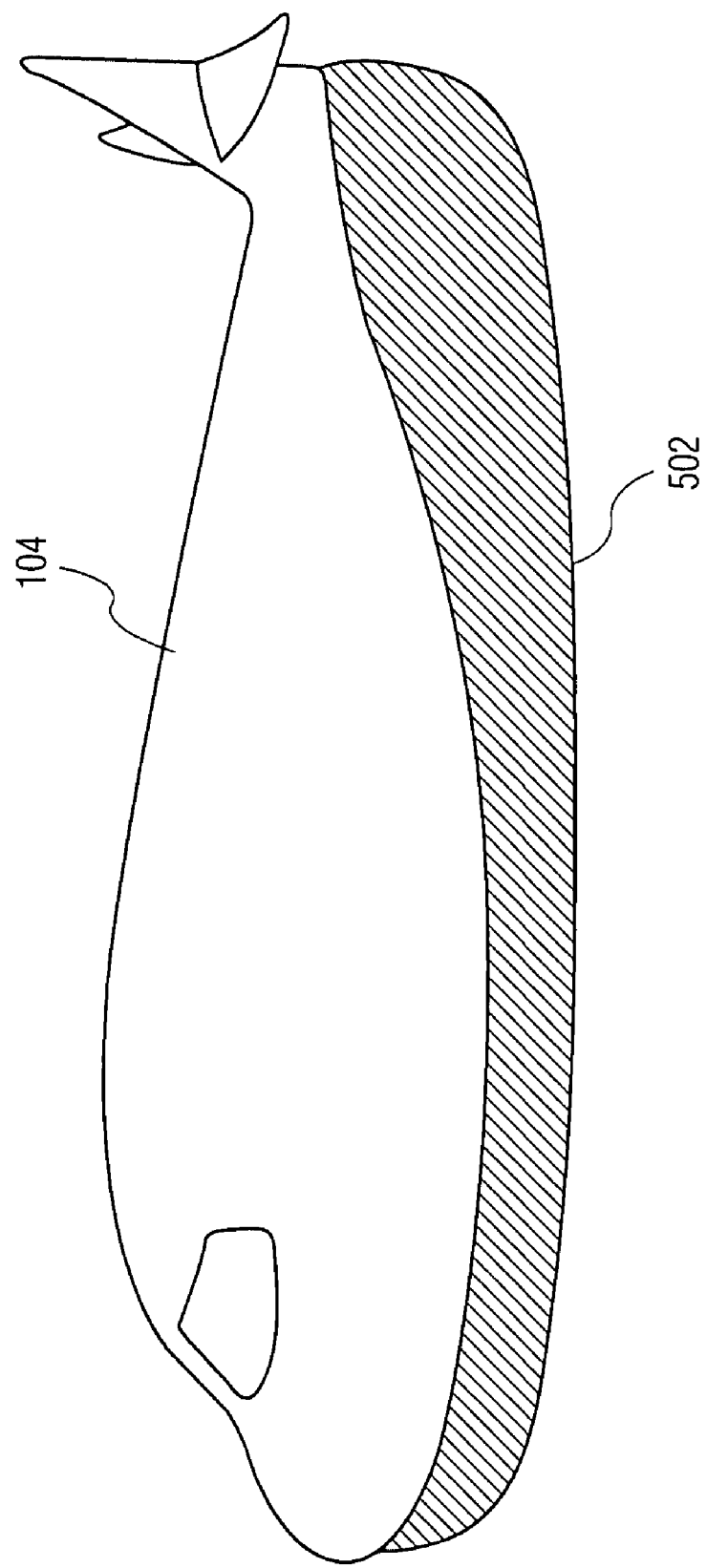
FIG. 5 illustrates an exemplary view of a fuselage airbag, in accordance with an embodiment of the present invention.

FIG. 5 illustrates an exemplary view of a fuselage airbag 502, in accordance with an embodiment of the present invention. With reference to FIG. 5, the bottom surface of fuselage 104 includes fuselage airbag 502. Fuselage airbag 502 is deployed prior to an impact with a surface, such as a piece of land or a body of water.

In an embodiment of the present invention, the bottom surface of fuselage 104 includes one or more compartments for sealing and storing one or more fuselage airbags, such as a fuselage airbag 502. Said fuselage airbags are stored in a collapsed state. Fuselage airbag 502 may be held within a compartment with the help of pins. In such a case, pin pullers may be used to release the pins, while the compartment is opened to release and deploy fuselage airbag 502.

Embodiments of the present invention provide an aircraft safety system that is non-electric based, and may be activated even in case of power failure. Aircraft safety system 200 employs non-electric module 202 for activating onboard devices 108. In addition, aircraft safety system 200 is a self-contained system, and is easy to install and use.

Embodiments of the present invention enable the separation of wings 106 and fuselage 104 in a rapid manner. An initiation signal produced by control arrangement 204 is transferred to onboard devices 108, via energetic devices 206, by using fiber-optic transfer lines.

Embodiments of the present invention provide various features that make aircraft safety system 200 reliable. For example, aircraft safety system 200 ensures that if fuselage parachute 214 is not deployed, wings 106 do not separate from fuselage 104. In case fuselage parachute 214 is not deployed in a proper manner, one or more reserve parachutes may be deployed. This delay in time also provides an opportunity to the pilot of aircraft 102 to attempt for landing aircraft 102. In addition, drog chute 224 is deployed to reduce the forward speed of aircraft 102 to the predefined speed. The predefined speed enables safe separation of wings 106 from fuselage 104. Moreover, non-electric module 202 may be activated by a remote control from a remote location. Therefore, a person designated at homeland security may activate aircraft safety system 200 even in case aircraft 102 is hijacked.

While embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

What is claimed is:

1. A system for enabling a safe landing of an aircraft during an in-flight emergency, the aircraft comprising a fuselage and a plurality of wings, the fuselage comprising a frame and a tail, each of said wings comprising one or more beams secured to and extending from the frame, the system comprising:
   a) a plurality of onboard devices for releasably securing said beams of each of said wings to the frame, wherein said onboard devices release said beams upon activation and wherein said beams are released to separate at least one of said wings from the fuselage, whereby the separation of the at least one of said wings enables the safe landing of the aircraft during the in-flight emergency;
   b) a non-electric module for activating said onboard devices;
   c) a fuselage parachute deploying device for deploying at least one fuselage parachute, said fuselage parachute being deployed upon activation of said fuselage parachute deploying device;
   d) a remote control, said remote control configured to remotely control said non-electric module and said fuselage parachute deploying device from a location outside said aircraft; and
   e) a control unit for deploying said fuselage parachute, said fuselage parachute being deployed prior to the separation of said wings from the fuselage.

2. The system according to claim 1, wherein each of said onboard devices explodes when activated, thereby releasing a respective one of said beams.

3. The system according to claim 1, wherein said nonelectric module comprises:
   a) a control arrangement for producing an initiation signal;
   b) a plurality of energetic devices, at least one of said energetic devices being mounted on each of said wings;
   c) a first set of transfer lines connecting the control arrangement with each of said energetic devices, the first set of transfer lines transferring the initiation signal from the control arrangement to said energetic devices; and
   d) a second set of transfer lines connecting said energetic devices with said onboard devices, the second set of transfer lines transferring the initiation signal from said energetic devices to said onboard devices, whereby said onboard devices are activated based on the initiation signal.

4. The system according to claim 3, wherein the first set of transfer lines comprises at least one of: fiber-optic transfer lines, explosive transfer lines, and detonation cords.

5. The system according to claim 3, wherein the second set of transfer lines comprises at least one of fiber-optic transfer lines, explosive transfer lines, and detonation cords.

6. The system according to claim 1, wherein said onboard devices comprise one or more of: explodable bolts, explodable rivets, burnable tapes, pin pullers, and cable cutters.

7. The system according to claim 1, further comprising one or more fuselage parachutes stored in the fuselage in a collapsed state.

8. The system according to claim 1, further comprising:
   a) a plurality of wing parachutes stored in said wings in a collapsed state, at least one of said wing parachutes being stored in each of said wings; and
   b) a wing-parachute manager for deploying said wing parachutes.

9. The system according to claim 1, further comprising:
a) one or more drog chutes stored in the tail of the fuselage in a collapsed state; and
b) a drog-chute manager for deploying said drog chutes, wherein said drog chutes are deployed prior to the separation of said wings from the fuselage.

10. The system according to claim 1, further comprising:
a) one or more fuselage airbags sealed and stored in a bottom surface of the fuselage in a collapsed state; and
b) an airbag manager for deploying said fuselage airbags, wherein said fuselage airbags are deployed prior to an impact of the fuselage with a surface.

11. An aircraft comprising:
a) a fuselage comprising:
  i) a frame; and
  ii) a tail;
b) a plurality of wings each comprising one or more beams secured to and extending from the frame;
c) an aircraft safety system for enabling a safe landing of the aircraft during an in-flight emergency, the aircraft safety system comprising:
  i) a plurality of onboard devices for releasably securing said beams of each of said wings to the frame, wherein said onboard devices release said beams upon activation and wherein said beams are released to separate at least one of said wings from the fuselage, whereby the separation of the at least one of said wings enables the safe landing of the aircraft during the in-flight emergency;
  ii) a non-electric module for activating said onboard devices;
  iii) a fuselage parachute deploying device for deploying at least one fuselage parachute, said fuselage parachute being deployed upon activation of said fuselage parachute deploying device; and
  iv) a control unit for deploying said fuselage parachute, said fuselage parachute being deployed prior to the separation of said wings from the fuselage; and
d) a remote control, said remote control configured to remotely control said non-electric module and said fuselage parachute deploying device from a location outside said aircraft.

12. The aircraft according to claim 11, wherein each of said onboard devices explodes when activated, thereby releasing a respective one of said beams.

13. The aircraft according to claim 11, wherein said non-electric module comprises:
a) a control arrangement for producing an initiation signal
b) a plurality of energetic devices, at least one of said energetic devices being mounted on each of said wings;
c) a first set of transfer lines connecting the control arrangement with each of said energetic devices, the first set of transfer lines transferring the initiation signal from the control arrangement to said energetic devices; and
d) a second set of transfer lines connecting said energetic devices with said onboard devices, the second set of transfer lines transferring the initiation signal from said energetic devices to said onboard devices, whereby said onboard devices are activated based on the initiation signal.

14. The aircraft according to claim 13, wherein the first set of transfer lines comprises at least one of: fiberoptic transfer lines, explosive transfer lines, and detonation cords.

15. The aircraft according to claim 13, wherein the second set of transfer lines comprises at least one of: fiberoptic transfer lines, explosive transfer lines, and detonation cords.

16. The aircraft according to claim 11, wherein said onboard devices comprise one or more of: explodable bolts, explodable rivets, burnable tapes, pin pullers, and cable cutters.

17. The aircraft according to claim 11, wherein the aircraft safety system further comprises one or more fuselage parachutes stored in the fuselage in a collapsed state.

18. The aircraft according to claim 11, wherein the aircraft safety system further comprises:
a) a plurality of wing parachutes stored in said wings in a collapsed state, at least one of said wing parachutes being stored in each of said wings; and
b) a wing-parachute manager for deploying said wing parachutes.

19. The aircraft according to claim 11, wherein the aircraft safety system further comprises:
a) one or more drog chutes stored in the tail of the fuselage in a collapsed state; and
b) a drog-chute manager for deploying said drog chutes, wherein said drog chutes are deployed prior to the separation of said wings from the fuselage.

20. The aircraft according to claim 11, wherein the aircraft safety system further comprises:
a) one or more fuselage airbags sealed and stored in a bottom surface of the fuselage in a collapsed state; and
b) an airbag manager for deploying said fuselage airbags, wherein said fuselage airbags are deployed prior to an impact of the fuselage with a surface.

21. A system for enabling a safe landing of an aircraft during an in-flight emergency, the aircraft comprising a fuselage and a plurality of wings, the fuselage comprising a frame and a tail, each of said wings comprising one or more beams secured to and extending from the frame, the system comprising:
a) a plurality of onboard devices for releasably securing said beams of each of said wings to the frame, wherein said onboard devices release said beams upon activation and wherein said beams are released to separate at least one of said wings from the fuselage, whereby the separation of the at least one of said wings enables the safe landing of the aircraft during the in-flight emergency;
b) a non-electric module for activating said onboard devices;
c) a fuselage parachute deploying device for deploying at least one fuselage parachute, said fuselage parachute being deployed upon activation of said fuselage parachute deploying device; and
d) a control unit for deploying said fuselage parachute, said fuselage parachute being deployed prior to the separation of said wings from the fuselage.

* * * * *